United States Patent Office 2,801,489
Patented Aug. 6, 1957

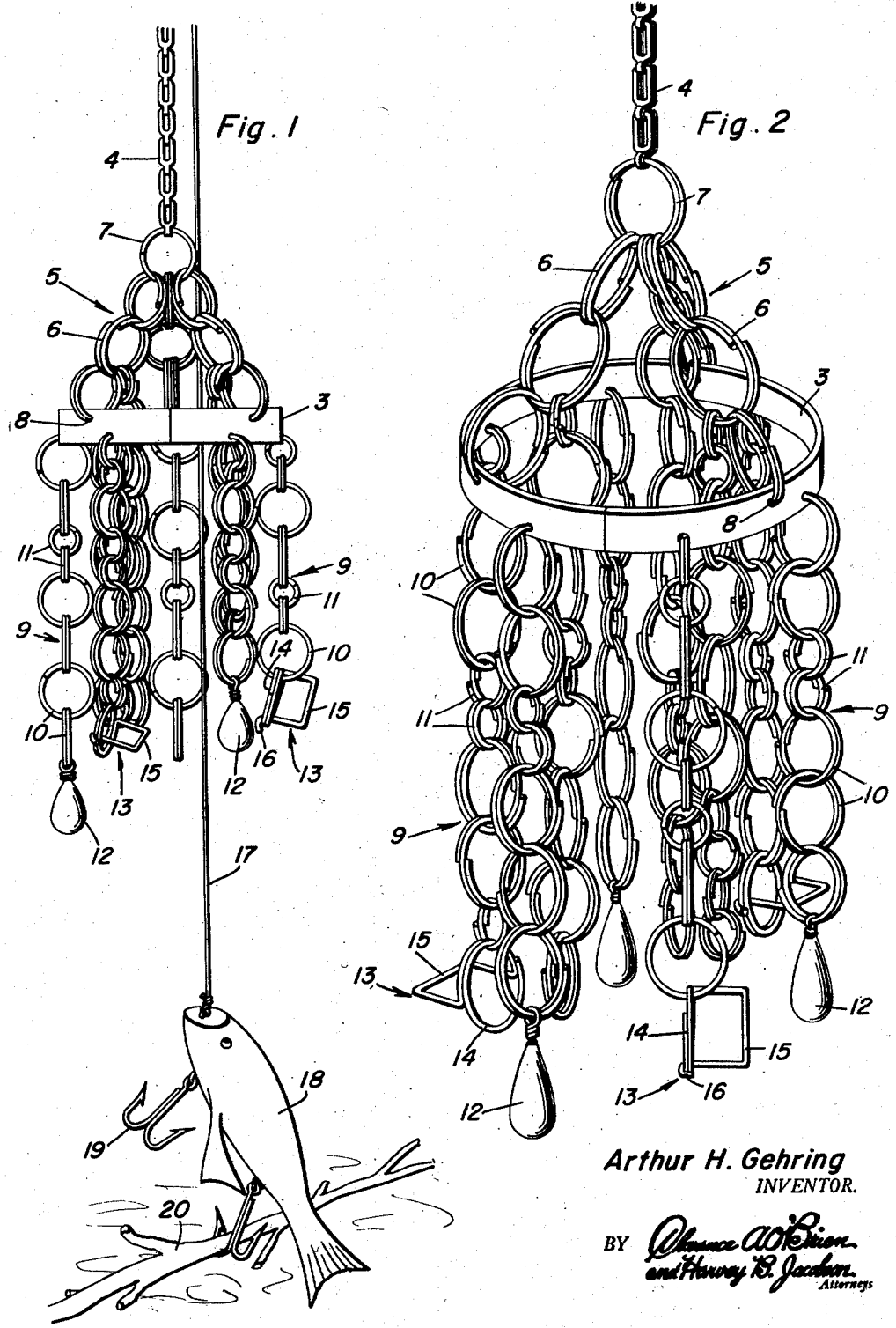

2,801,489

FISHING PLUG RETRIEVER

Arthur H. Gehring, Bismarck, N. Dak.

Application May 1, 1956, Serial No. 581,997

1 Claim. (Cl. 43—17.2)

The present invention relates to new and useful improvements in fishing plug retrievers and has for its primary object to provide, in a manner as hereinafter set forth, a device of this character which is adapted to be slidably mounted on a line to be guided thereby to the fouled plug to be retrieved.

Another very important object of the invention is to provide a retriever of the aforementioned character comprising novel means for engaging the hooks of the fouled plug.

Other objects of the invention are to provide a fishing plug or lure retriever of the character described which will be comparatively simple in construction, strong, durable, highly efficient and reliable in use and which may be manufactured at low cost.

These together with the objects and advantages which will be subsequently apparent reside in the details of construction and operation as more fully hereinafter described and claimed, reference being had to the accompanying drawings forming a part hereof, wherein like numerals refer to like parts throughout and in which:

Figure 1 is a view in side elevation, showing a retriever constructed in accordance with the present invention in use; and Figure 2 is a perspective view of the device.

Referring now to the drawing in detail, it will be seen that the embodiment of the invention which has been illustrated comprises a split, cylindrical ring 3 of suitable resilient metal. The ring 3 is attached to one end of an operating chain 4 through the medium of the bridle 5. The bridle 5 comprises relatively short chains 6 having one end connected by a ring 7 to which the chain 4 is connected. The lower ends of the bridle chains 6 are engaged in apertures 8 provided therefor in the ring 3. The elements 6 and 7 are in the form of coils of suitable resilient metal.

Suspended from the ring 3 and from the bridle 5 is a plurality of chains 9. The chains 9 include large and small links 10 and 11, respectively, in the form of coiled rings of resilient metal. Sinkers 12 are suspended from the lower ends of certain of the chains 9.

Certain of the remaining chains 9 terminate, at their lower ends, in links or rings 13. The rings 13 are in the form of coils 14 having one end portion formed to provide right angularly extending, substantially U-shaped members 15 which terminate in hooks 16 engaged with said coils 14.

It is thought that the use of the device will be readily apparent from the consideration of the foregoing. Briefly, the resilient ring 3 is sprung open to permit the insertion of a fishing line, as indicated at 17. Reference character 18 designates a fouled plug on the lower end of the line 17. Through the medium of the chain 4, the device is lowered on the line 7 to the plug 18. The device is then manipulated until one or more of the elements comprising the chains 9 engage the usual hooks 19 of the plug 18. Through the medium of the chain 4, sufficient upward force may now be exerted to free the plug 18 from the object on which it is fouled, as indicated at 20. The members 15 of the rings 13 are particularly adapted to engage the hooks 19 and firmly anchor the retriever to the plug.

The sinkers 12 facilitate sliding the device down the line in addition to assisting in preventing the chains 9 from becoming entangled.

The foregoing is considered illustrative only of the principles of the invention. Further, since numerous modifications and changes will readily occur to those skilled in the art it is not desired to limit the invention to the exact construction and operation described, and accordingly all suitable modifications and equivalents may be resorted to falling within the scope of the invention as claimed.

What is claimed as new is as follows:

A fishing plug retriever comprising: a split ring slidable on a fishing line, a plurality of chains suspended from said ring, certain of said chains comprising, on their free ends, wire coils including substantially U-shaped lateral members engageable with the hooks of a plug to be retrieved and comprising hooks on one end engaged with said coils, sinkers suspended from the free ends of certain of the remaining chains, a bridle comprising chains having one end connected to the ring, a coil connecting the other ends of the bridle chains, an operating chain connected to the last named coil, and chains depending from the bridle chains through the ring and engageable with the plug hooks.

References Cited in the file of this patent

UNITED STATES PATENTS

| | | |
|---|---|---|
| 1,774,643 | Fullerton | Sept. 2, 1930 |
| 2,493,100 | Adams | Jan. 3, 1950 |
| 2,676,430 | Richard | Apr. 27, 1954 |